United States Patent
Kim et al.

(10) Patent No.: US 11,180,652 B2
(45) Date of Patent: Nov. 23, 2021

(54) THERMOPLASTIC RESIN COMPOSITION AND MOLDED PRODUCT USING SAME

(71) Applicant: LOTTE CHEMICAL CORPORATION, Seoul (KR)

(72) Inventors: Myunghun Kim, Uiwang-si (KR); Keehae Kwon, Uiwang-si (KR); Jungeun Park, Uiwang-si (KR)

(73) Assignee: Lotte Chemical Corporation, Seoul (KR)

(*) Notice: Subject to any disclaimer, the term of this patent is extended or adjusted under 35 U.S.C. 154(b) by 0 days.

(21) Appl. No.: 16/957,847

(22) PCT Filed: Nov. 2, 2018

(86) PCT No.: PCT/KR2018/013266
§ 371 (c)(1),
(2) Date: Jun. 25, 2020

(87) PCT Pub. No.: WO2019/132221
PCT Pub. Date: Jul. 4, 2019

(65) Prior Publication Data
US 2021/0054193 A1 Feb. 25, 2021

(30) Foreign Application Priority Data

Dec. 29, 2017 (KR) .................. 10-2017-0184872

(51) Int. Cl.
*C08L 69/00* (2006.01)

(52) U.S. Cl.
CPC .......... *C08L 69/00* (2013.01); *C08L 2205/025* (2013.01); *C08L 2205/035* (2013.01); *C08L 2207/02* (2013.01); *C08L 2207/04* (2013.01); *C08L 2207/53* (2013.01)

(58) Field of Classification Search
CPC ........... C08L 69/00; C08L 55/02; C08L 67/02
See application file for complete search history.

(56) References Cited

U.S. PATENT DOCUMENTS

| | | |
|---|---|---|
| 2009/0326110 A1 | 12/2009 | Tanaka et al. |
| 2012/0065318 A1 | 3/2012 | Park et al. |
| 2013/0281568 A1 | 10/2013 | Park et al. |
| 2016/0137837 A1 | 5/2016 | Kwon et al. |
| 2016/0185959 A1 | 6/2016 | Kim et al. |
| 2016/0312026 A1 | 10/2016 | Kim et al. |
| 2016/0319128 A1 | 11/2016 | Park et al. |

FOREIGN PATENT DOCUMENTS

| | | |
|---|---|---|
| KR | 10-2904-0000899 A | 1/2004 |
| KR | 10-2008-0049034 A | 3/2007 |
| KR | 10-2010-0121131 A | 11/2010 |
| KR | 10-2010-0133786 A | 12/2010 |
| KR | 10-2012-0075053 A | 7/2012 |
| KR | 10-2013-0090362 A | 8/2013 |
| KR | 10-2016-0057558 A | 5/2016 |
| KR | 10-2016-0059529 A | 5/2016 |
| KR | 10-2016-0081794 A | 7/2016 |
| KR | 10-2016-0127262 A | 11/2016 |
| KR | 10-2016-0129746 A | 11/2016 |
| WO | 2019/132221 A1 | 7/2019 |

OTHER PUBLICATIONS

International Search Report in counterpart International Application No. PCT/KR2018/013266 dated Apr. 24, 2019, pp. 1-6.

*Primary Examiner* — Mark S Kaucher
(74) *Attorney, Agent, or Firm* — Additon, Pendleton & Witherspoon, P.A.

(57) ABSTRACT

The present invention relates to a thermoplastic resin composition comprising (A) 60 wt % to 75 wt % of a polycarbonate resin, (B) 5 wt % to 20 wt % of a polybutylene terephthalate resin, (C) 2 wt % to 8 wt % of a polyethylene terephthalate resin, (D) 1 wt % to 5 wt % of a methyl methacrylate-styrene-acrylonitrile copolymer, (E) 3 wt % to 8 wt % of an acrylonitrile-butadiene-styrene graft copolymer including a rubbery polymer having an average particle diameter of 200 nm to 400 nm, and (F) 5 wt % to 10 wt % of an acrylonitrile-butadiene-styrene copolymer including a rubbery polymer having an average particle diameter of 400 nm to 600 nm, and to a molded product using the same.

10 Claims, 1 Drawing Sheet

[FIG. 1]
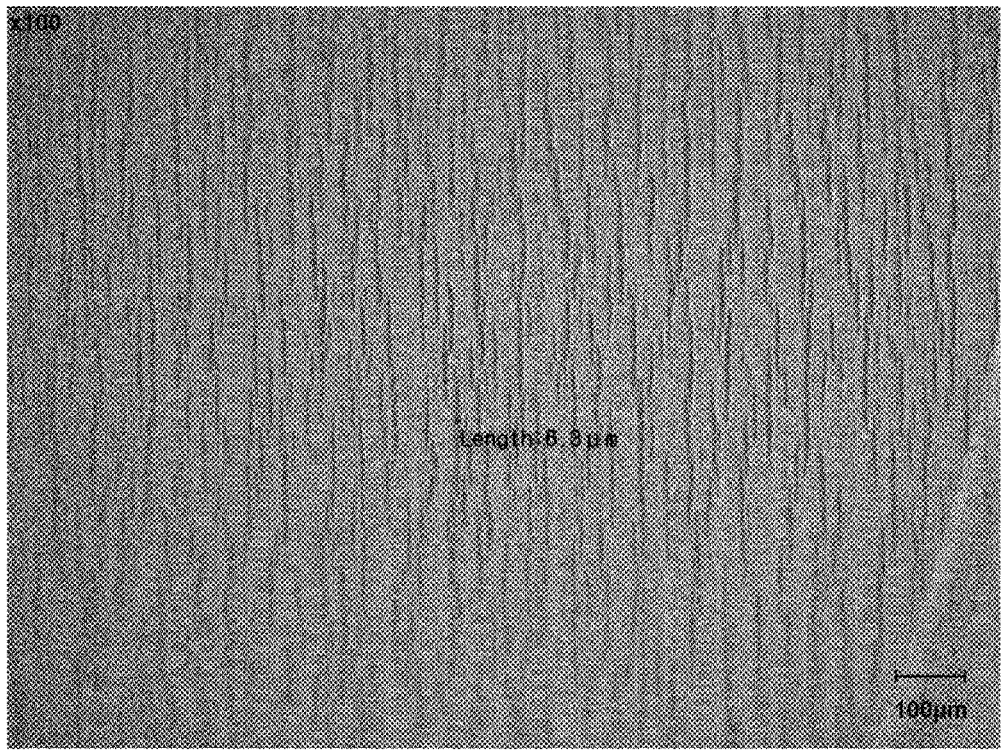
[FIG. 2]
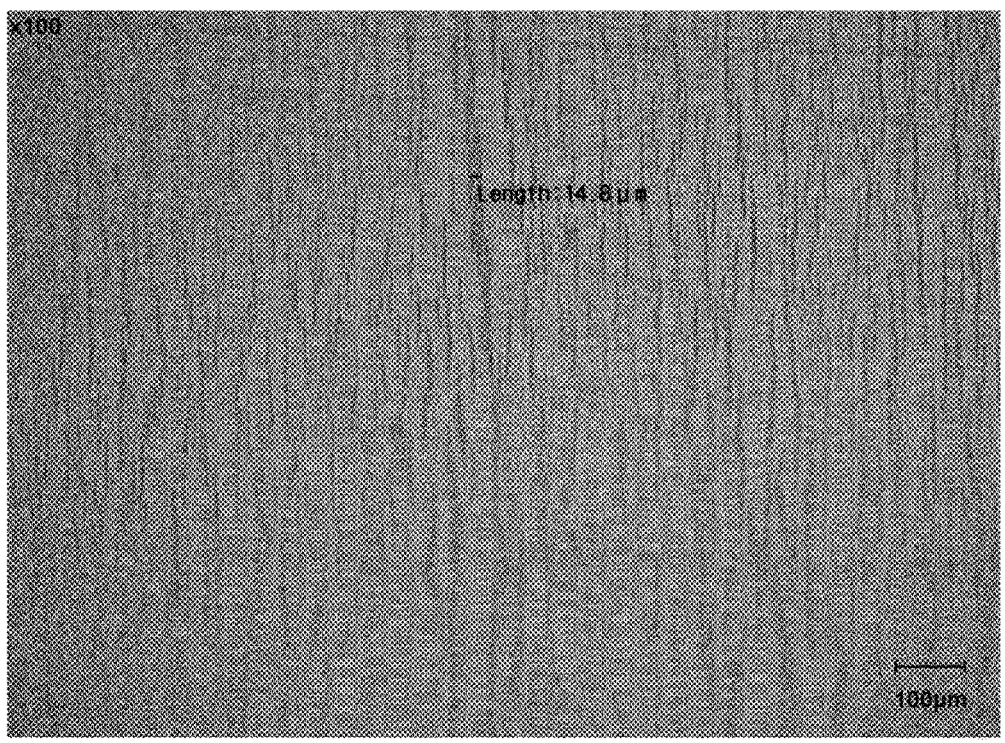

THERMOPLASTIC RESIN COMPOSITION AND MOLDED PRODUCT USING SAME

CROSS-REFERENCE TO RELATED APPLICATIONS

This application claims priority to and the benefit of International Application No. PCT/KR2018/013266, filed Nov. 2, 2018, which published as WO 2019/132221 on Jul. 4, 2019, and Korean Patent Application No. 10-2017-0184872, filed in the Korean Intellectual Property Office on Dec. 29, 2017, the entire disclosure of each of which is incorporated herein by reference.

TECHNICAL FIELD

A thermoplastic resin composition and a molded product using the same are disclosed.

BACKGROUND ART

Polycarbonate resins are widely used as one of engineering plastics in a plastic industry.

The polycarbonate resins have a glass transition temperature (Tg) reaching about 150° C. due to a bulky molecular structure such as bisphenol-A and thus shows high heat resistance and also has flexibility and rigidity given by a carbonyl group of a carbonate group having high rotating mobility. In addition, it is an amorphous polymer and thus has excellent transparency characteristics.

In addition, the polycarbonate has excellent impact resistance and compatibility with other resins and the like but a defect of low flowability and thus, may also be largely used as alloys with various resins in order to complement workability and post processability.

Of these, a polycarbonate/acrylonitrile-butadiene-styrene copolymer (PC/ABS) alloy has excellent durability, processability, heat resistance, impact resistance, and the like and may be applied to vast fields such as electricity electronics, an automobile, an architecture, miscellaneous real life materials, and the like.

However, the PC/ABS alloy lacks resistance about chemicals used for cosmetics and air fresheners used inside a vehicle and the like, and thus may be damaged when applied to an automotive interior material.

On the other hand, a polyester resin has excellent mechanical characteristics, electrical characteristics, chemical resistance, and the like, and particularly, a fast crystallization rate and thus excellent molding processability but a problem of a low glass transition temperature and thus low heat resistance and also, low impact resistance at room temperature and low temperature.

Accordingly, an attempt to increase a molecular weight of the polycarbonate resin has been conventionally made as one of methods of reinforcing the chemical resistance but may noticeably deteriorate processability and thus put a limitation on a size of applied parts.

In addition, an attempt to use a polyester/polycarbonate (polyester/PC) alloy using the polyester resin having a fast crystallization rate along with the polycarbonate resin has been made, but as an amount of the polyester resin is increased, heat resistance is deteriorated, and a deviation in terms of appearance and mechanical properties may occur due to phase instability between the polyester and the polycarbonate.

Accordingly, in order to solve the problems, development of a thermoplastic resin composition having excellent chemical resistance, impact resistance, and heat resistance compared with the conventional PC/ABS alloy or polyester/PC alloy is required.

DISCLOSURE

Technical Problem

A thermoplastic resin composition having excellent chemical resistance, impact resistance, and heat resistance, and a molded product using the same are provided.

Technical Solution

According to an embodiment, a thermoplastic resin composition comprises (A) 60 wt % to 75 wt % of a polycarbonate resin; (B) 5 wt % to 20 wt % of a polybutylene terephthalate resin; (C) 2 wt % to 8 wt % of a polyethylene terephthalate resin; (D) 1 wt % to 5 wt % of a methyl methacrylate-styrene-acrylonitrile copolymer; (E) 3 wt % to 8 wt % of an acrylonitrile-butadiene-styrene graft copolymer including a rubbery polymer having an average particle diameter of 200 nm to 400 nm; and (F) 5 wt % to 10 wt % of an acrylonitrile-butadiene-styrene copolymer including a rubbery polymer having an average particle diameter of 400 nm to 600 nm.

The acrylonitrile-butadiene-styrene graft copolymer (E) may have a core-shell structure including a core composed of a butadiene-based rubbery polymer, and a shell composed by graft polymerization of acrylonitrile and styrene on the core.

The core may be included in an amount of 40 to 50 parts by weight based on 100 parts by weight of the acrylonitrile-butadiene-styrene graft copolymer (E).

The styrene may be included in an amount of 60 to 80 parts by weight, and the acrylonitrile may be included in an amount of 20 to 40 parts by weight based on 100 parts by weight of the shell of the acrylonitrile-butadiene-styrene graft copolymer (E).

The acrylonitrile-butadiene-styrene copolymer (F) may include a dispersed phase of a core-shell structure including a core composed of a butadiene-based rubbery polymer and a shell composed by graft polymerization of acrylonitrile and styrene on the core, and a styrene-acrylonitrile copolymer continuous phase.

The core may be included in an amount of 10 to 15 parts by weight based on 100 parts by weight of the acrylonitrile-butadiene-styrene copolymer (F).

A weight ratio of the acrylonitrile-butadiene-styrene graft copolymer (E) and the acrylonitrile-butadiene-styrene copolymer (F) may be 1:1 to 1:2.

The methyl methacrylate-styrene-acrylonitrile copolymer (D) may be a copolymer of a monomer mixture including 60 wt % to 80 wt % of methyl methacrylate, 10 wt % to 30 wt % of styrene, and greater than 0 wt % and less than or equal to 10 wt % of acrylonitrile.

The methyl methacrylate-styrene-acrylonitrile copolymer (D) may have a weight average molecular weight of 50,000 g/mol to 200,000 g/mol.

Meanwhile, a molded product using a thermoplastic resin composition according to an embodiment may be provided.

Advantageous Effects

The thermoplastic resin composition according to an embodiment and a molded product using the same may be widely applied to molding of various products used for painting and non-painting, particularly automobile interior materials, as they have excellent chemical resistance, impact resistance, and heat resistance.

DESCRIPTION OF DRAWINGS

FIGS. 1 and 2 are optical microscopic images showing the results of chemical resistance evaluation of the test specimens according to Example 1 and Comparative Example 4, respectively.

BEST MODE

Hereinafter, embodiments of the present invention are described in detail. However, these embodiments are exemplary, the present invention is not limited thereto and the present invention is defined by the scope of claims.

In the present invention, unless otherwise described, the average particle diameter refers to a volume average diameter, and refers to a Z-average particle diameter measured using a dynamic light scattering analyzer.

According to an embodiment, a thermoplastic resin composition comprises (A) 60 wt % to 75 wt % of a polycarbonate resin; (B) 5 wt % to 20 wt % of a polybutylene terephthalate resin; (C) 2 wt % to 8 wt % of a polyethylene terephthalate resin; (D) 1 wt % to 5 wt % of a methyl methacrylate-styrene-acrylonitrile copolymer; (E) 3 wt % to 8 wt % of an acrylonitrile-butadiene-styrene graft copolymer including a rubbery polymer having an average particle diameter of 200 nm to 400 nm; and (F) 5 wt % to 10 wt % of an acrylonitrile-butadiene-styrene copolymer including a rubbery polymer having an average particle diameter of 400 nm to 600 nm.

Hereinafter, each component of the thermoplastic resin composition is described in detail.

(A) Polycarbonate Resin

The polycarbonate resin is a polyester having a carbonate bond, is not particularly limited, and may be any polycarbonate that is usable in a field of resin composition.

For example, the polycarbonate resin may be prepared by reacting diphenols represented by Chemical Formula 1 with phosgene, halogenic acid ester, carbonate ester, or a combination thereof.

[Chemical Formula 1]

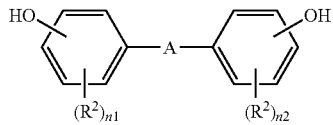

In Chemical Formula 1,

A is a linking group selected from the group consisting of a single bond, a substituted or unsubstituted C1 to C30 alkylene group, a substituted or unsubstituted C2 to C5 alkenylene group, a substituted or unsubstituted C2 to C5 alkylidene group, a substituted or unsubstituted C1 to C30 haloalkylene group, a substituted or unsubstituted C5 to C6 cycloalkylene group, a substituted or unsubstituted C5 to C6 cycloalkenylene group, a substituted or unsubstituted C5 to C10 cycloalkylidene group, a substituted or unsubstituted C6 to C30 arylene group, a substituted or unsubstituted C1 to C20 alkoxylene group, a halogenic acid ester group, a carbonate ester group, CO, S, and $SO_2$, $R^1$ and $R^2$ are independently a substituted or unsubstituted C1 to C30 alkyl group or a substituted or unsubstituted C6 to C30 aryl group, and n1 and n2 are independently an integer ranging from 0 to 4.

Two or more types of the diphenols represented by Chemical Formula 1 may be combined to constitute a repeating unit of a polycarbonate resin.

Specific examples of the diphenols may be hydroquinone, resorcinol, 4,4'-dihydroxydiphenyl, 2,2-bis(4-hydroxyphenyl)propane (referred to as 'bisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3-methyl-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, and the like. Among the diphenols, 2,2-bis(4-hydroxyphenyl)propane, 2,2-bis(3-methyl-4-hydroxyphenyl)propane, 2,2-bis(3,5-dimethyl-4-hydroxyphenyl)propane, 2,2-bis(3,5-dichloro-4-hydroxyphenyl)propane, or 1,1-bis(4-hydroxyphenyl)cyclohexane may be desirably used. 2,2-bis(4-hydroxyphenyl)propane may be more desirably used.

The polycarbonate resin may be a mixture of copolymers obtained using two or more types of dipenols that differ from each other.

In addition, the polycarbonate resin may be a linear polycarbonate resin, a branched polycarbonate resin, a polyester carbonate copolymer resin, and the like.

Specific examples of the linear polycarbonate resin may be a bisphenol-A polycarbonate resin. Specific examples of the branched polycarbonate resin may be a resin prepared by reacting a multi-functional aromatic compound such as trimellitic anhydride, trimellitic acid, and the like with diphenols and carbonates. The polyester carbonate copolymer resin may be prepared by reacting bifunctional carboxylic acid with diphenols and carbonates, wherein the used carbonate is diaryl carbonate, such as diphenyl carbonate, or ethylene carbonate.

The polycarbonate resin may have a weight average molecular weight of 10,000 g/mol to 200,000 g/mol, for example, 14,000 g/mol to 40,000 g/mol. When the weight average molecular weight of the polycarbonate resin is within the ranges, excellent impact resistance and flowability may be obtained.

The polycarbonate resin may be included in an amount of 60 wt % to 75 wt %, for example 60 wt % to 70 wt % based on 100 wt % of the thermoplastic resin composition. When the polycarbonate resin is less than 60 wt %, appearance characteristics are not good, and when the polycarbonate resin is more than 75 wt %, mechanical strength may be degraded.

Meanwhile, the polycarbonate resin may be used by mixing two or more polycarbonate resins having different weight average molecular weights or melt-flow indices.

It is easy to control the thermoplastic resin composition to have desired flowability by mixing and using polycarbonate resins having different weight average molecular weights or melt-flow indices.

(B) Polybutylene Terephthalate Resin

The polybutylene terephthalate resin is in general obtained through a polycondensation reaction of terephthalic acid or a derivative thereof with 1,4-butanediol or a derivative thereof but through a copolymerization of dicarboxylic acid, glycol, or the like, unless the purpose of the present invention is damaged.

Herein, examples of the copolymerizable dicarboxylic acid may be isophthalic acid, 2-chloro terephthalic acid, 2,5-dichloroterephthalic acid, 2-methylterephthalic acid, 4,4-stilbene dicarboxylic acid, 4,4-biphenyl dicarboxylic acid, orthophthalic acid, 2,6-naphthalene dicarboxylic acid, bisbenzoic acid, bis(p-carboxylphenyl) methane, anthracene dicarbonic acid, 4,4-diphenylether dicarboxylic acid, 4,4-diphenoxyethanedicarbonic acid, adipic acid, sebacic acid, azelaic acid, dodecane diacid, 1,3-cyclohexane dicarboxylic acid, 1,4-cyclohexane dicarboxylic acid, and the like. The copolymerizable dicarboxylic acid may be exemplified and examples thereof may be used alone or as a mixture of two or more.

On the other hand, the copolymerizable glycol may be ethylene glycol, 1,2-propylene glycol, 1,3-propanediol, 2,2-dimethyl-1,3-propanediol, trans-2,2,4,4,-tetramethyl-1,3-cyclobutane diol, cis-2,2,4,4,-tetramethyl-1,3-cyclobutane diol, neopentylglycol, 1,5-pentanediol, 1,6-hexanediol, 1,4-cyclohexanedimethanol, 1,3-cyclohexanedimethanol, decamethylene glycol, cyclohexane diol, p-xylene diol, bisphenol A, tetrabromo bisphenol A, tetrabromo bisphenol A-bis (2-hydroxyethylether), and the like. The copolymerizable glycol may be exemplified and examples thereof may be used alone or as a mixture of two or more.

In addition, the polybutylene terephthalate resin may have intrinsic viscosity ranging from about 0.7 to about 1.50 dl/g, which is measured at 25° C. by using an o-chloro phenol solvent in order to sufficiently secure impact resistance of a molded product formed by using a thermoplastic resin composition.

The polybutylene terephthalate resin according to an embodiment may be included in an amount of 5 wt % to 20 wt %, for example 10 wt % to 20 wt % based 100 wt % of the thermoplastic resin composition. When the polybutylene terephthalate resin is included within the ranges, the thermoplastic resin composition may have excellent chemical resistance.

On the other hand, when the polybutylene terephthalate resin is included in an amount of less than 5 wt % based on 100 wt % of the thermoplastic resin composition, painting and appearance characteristics are deteriorated, such as weld lines occurring in a molded product using the thermoplastic resin composition. In addition, when polybutylene terephthalate resin is included in an amount of greater than 20 wt %, heat resistance and low temperature impact resistance are deteriorated, and a color stain may be generated.

(C) Polyethylene Terephthalate Resin

The polyethylene terephthalate resin may include a polyethylene terephthalate (PET), polytetramethylene glycol (PTMG), polypropylene glycol (PPG), a copolymer of an aliphatic polyester or an aliphatic polyamide and polyethylene terephthalate (PET), and a combination thereof.

For example, the polyethylene terephthalate resin may be a polyethylene terephthalate resin recycled from waste polyethylene terephthalate. Herein, the waste polyethylene terephthalate refers to a used polyethylene terephthalate resin like a waste PET bottle or the like, and may be a waste polyethylene terephthalate resin used more than twice.

The polyethylene terephthalate resin according to an embodiment may be included in an amount of 2 wt % to 8 wt %, for example 3 wt % to 7 wt % based 100 wt % of the thermoplastic resin composition. When the polyethylene terephthalate resin is included within the above range, the thermoplastic resin composition has improved heat resistance and impact resistance. According to an embodiment, the polyethylene terephthalate resin is used in combination with the polybutylene terephthalate resin. In an embodiment, by including the polyethylene terephthalate resin within the above-described range, it is possible to supplement/enhance the heat resistance and impact resistance of the thermoplastic resin composition that may be lowered by polybutylene terephthalate.

On the other hand, when the polyethylene terephthalate resin is included in an amount of less than 2 wt % based on 100 wt % of the thermoplastic resin composition, heat resistance may be lowered, while when the polyethylene terephthalate resin is included in greater than 8 wt % based on 100 wt % of the thermoplastic resin composition, chemical resistance may be deteriorated.

(D) Methyl Methacrylate-Styrene-Acrylonitrile Copolymer

The methyl methacrylate-styrene-acrylonitrile copolymer improves compatibility between the polycarbonate resin and the polyester-based resins (polybutylene terephthalate resin and polyethylene terephthalate resin) and is a terpolymer of methyl methacrylate, styrene, and acrylonitrile.

The methyl methacrylate-styrene-acrylonitrile copolymer may be a copolymer of a monomer mixture including 60 to 80 wt % of methyl methacrylate, 10 to 30 wt % of styrene, and greater than 0 wt % and less than or equal to about 10 wt % of acrylonitrile.

When the components of the methyl methacrylate-styrene-acrylonitrile copolymer have a ratio satisfying the ranges, compatibility between the polycarbonate resin and the polyester-based resins may be improved.

The methyl methacrylate-styrene-acrylonitrile copolymer may have a weight average molecular weight of 50,000 g/mol to 200,000 g/mol, for example 60,000 g/mol to 200,000 g/mol, for example 70,000 g/mol to 180,000 g/mol, for example 80,000 g/mol to 160,000 g/mol, for example 80,000 g/mol to 140,000 g/mol, for example 80,000 g/mol to 120,000 g/mol, for example 90,000 g/mol to 110,000 g/mol. When the methyl methacrylate-styrene-acrylonitrile copolymer has a weight average molecular weight within the ranges, a morphology among the components may be improved without damaging flowability of the resin composition in a shear rate area during the injection molding.

The methyl methacrylate-styrene-acrylonitrile copolymer may be included in an amount of 1 wt % to 5 wt %, for example 1 wt % to 4 wt % based 100 wt % of the thermoplastic resin composition. When the methyl methacrylate-styrene-acrylonitrile copolymer is less than 1 wt %, compatibility between the polycarbonate resin and the polyester-based resins may be deteriorated, while when it is greater than 5 wt %, the resin composition is difficult to process due to deteriorated flowability of the resin composition.

(E, F) Acrylonitrile-Butadiene-Styrene Graft Copolymer and Acrylonitrile-Butadiene-Styrene Copolymer The acrylonitrile-butadiene-styrene graft copolymer that is present as a dispersed phase in the acrylonitrile-butadiene-styrene copolymer (F) and the acrylonitrile-butadiene-styrene graft copolymer (E) of the present invention may have a core-shell structure in which a core is formed of a butadiene-based rubbery polymer component and a shell is formed using acrylonitrile and styrene around the core.

The rubbery polymer component of the core improves impact strength at particularly low temperatures, while the shell component reduces interfacial tension to improve adherence at the interface.

In an embodiment, the acrylonitrile-butadiene-styrene graft copolymer (E) and the acrylonitrile-butadiene-styrene copolymer (F) differ from each other in terms of the average particle diameter of the rubbery polymer and the method of shell formation.

The acrylonitrile-butadiene-styrene graft copolymer (E) may be prepared by adding styrene and acrylonitrile to a butadiene-based rubbery polymer and performing graft copolymerization through conventional polymerization methods such as emulsion polymerization and bulk polymerization. That is, the acrylonitrile-butadiene-styrene graft copolymer may be a core-shell structured graft copolymer having a shell formed by graft polymerization of acrylonitrile and styrene on a core composed of a butadiene-based rubbery polymer.

The acrylonitrile-butadiene-styrene graft copolymer (E) may include a rubbery polymer having an average particle diameter of, for example 200 nm to 400 nm, for example 200 nm to 350 nm, for example 250 nm to 350 nm.

The acrylonitrile-butadiene-styrene graft copolymer (E) may be included in an amount of 3 wt % to 8 wt %, for example 4 wt % to 7 wt %, based on 100 wt % of the thermoplastic resin composition.

Based on 100 parts by weight of the acrylonitrile-butadiene-styrene graft copolymer (E), the butadiene-based rubbery polymer core may be included in an amount of 40 parts by weight to 50 parts by weight, and the shell may be included in an amount of 50 parts by weight to 60 parts by weight. On the other hand, based on 100 parts by weight of the shell, the styrene may be included in an amount of 60 parts by weight to 80 parts by weight, and the acrylonitrile may be included in an amount of 20 parts by weight to 40 parts by weight.

When the acrylonitrile-butadiene-styrene graft copolymer (E) is included in an amount of less than 3 wt % based on a total amount of the thermoplastic resin composition, impact resistance of the thermoplastic resin composition may be deteriorated, but when the acrylonitrile-butadiene-styrene graft copolymer (E) is included in an amount of greater than 8 wt %, heat resistance may be deteriorated.

The acrylonitrile-butadiene-styrene copolymer (F) may be prepared through suspension or bulk polymerization of three components of butadiene rubbery polymer, acrylonitrile, and styrene.

The acrylonitrile-butadiene-styrene copolymer (F) may include a dispersed phase of a core-shell structure including a core composed of a butadiene-based rubbery polymer and a shell composed by graft polymerization of acrylonitrile and styrene on the core, and a styrene-acrylonitrile copolymer continuous phase.

The acrylonitrile-butadiene styrene copolymer (F) may include a rubbery polymer having an average particle diameter of, for example 300 nm to 1,000 nm, for example 300 nm to 900 nm, for example 300 nm to 800 nm, for example 300 nm to 700 nm, for example 350 nm to 650 nm, for example 400 nm to 600 nm, for example 450 nm to 550 nm.

The acrylonitrile-butadiene-styrene copolymer (F) may be included in an amount of 5 wt % to 10 wt %, for example 6 wt % to 10 wt % based on 100 wt % of the thermoplastic resin composition.

Based on 100 parts by weight of the acrylonitrile-butadiene-styrene copolymer (F), the butadiene-based rubbery polymer core may be included in an amount of 10 parts by weight to 15 parts by weight. A weight average molecular weight of the styrene-acrylonitrile copolymer forming a continuous phase may be for example, 150,000 g/mol to 250,000 g/mol, for example, 170,000 g/mol to 230,000 g/mol.

When the acrylonitrile-butadiene-styrene copolymer (F) is included in an amount of less than 5 wt % based on a total amount of the thermoplastic resin composition, heat resistance of the thermoplastic resin composition may be deteriorated, but when the acrylonitrile-butadiene-styrene copolymer (F) is included in an amount of greater than 10 wt %, impact resistance may be deteriorated.

On the other hand, in an embodiment, the acrylonitrile-butadiene-styrene graft copolymer (E) and the acrylonitrile-butadiene-styrene copolymer (F) may be used in a weight ratio of 1:1 to 1:2, for example, 1:1.2 to 1:1.8.

When the acrylonitrile-butadiene-styrene graft copolymer (E) and the acrylonitrile-butadiene-styrene copolymer (F) respectively satisfy the weight ratio and the average particle diameter range of the rubbery polymer, a thermoplastic resin composition simultaneously having excellent impact resistance and processability may be provided.

(G) Other Additives

The thermoplastic resin composition may further include additives optionally in accordance with its use. The additives may include flame retardants, lubricants, plasticizers, heat stabilizers, antioxidants, light stabilizers, or colorants and two or more types may be mixed in accordance with characteristics of final molded products.

The flame retardant is a material for reducing flammability and may include at least one of a phosphate compound, a phosphite compound, a phosphonate compound, polysiloxane, a phosphazene compound, a phosphinate compound, or a melamine compound, but is not limited thereto.

The lubricant plays a role of lubricating the surface of a metal contacting with the thermoplastic resin composition during the processing/molding/extruding and thus helping a flow or movement of the thermoplastic resin composition.

The plasticizer may be generally used to increase flexibility, process workability, or expansion property of the thermoplastic resin composition and may be any generally-used materials.

The heat stabilizer may suppress a thermal decomposition of the thermoplastic resin composition when kneaded or molded at a high temperature and may be any generally-used materials.

The antioxidant may suppress or block a chemical reaction of the thermoplastic resin composition with oxygen and thus prevent decomposition of the thermoplastic resin composition and loss of its inherent properties and include at least one of phenol-type, phosphate-type, thioether-type, or amine-type antioxidants, but is not limited thereto.

The light stabilizer suppresses or blocks decomposition of the thermoplastic resin composition from ultraviolet (UV) and thus its color change or mechanical property loss and specifically, may include at least one of hindered phenol type, benzophenone type, or benzotriazole type light stabilizers, but is not limited thereto.

The colorant may include a general pigment or dye.

The additives may be included in an amount of 0.1 parts by weight to 15 parts by weight based on 100 parts by weight of the thermoplastic resin composition.

The thermoplastic resin composition according to the present disclosure may be prepared in a well-known method of preparing a thermoplastic resin composition.

For example, the thermoplastic resin composition according to the present invention may be manufactured into a pellet by mixing components and other additives simultaneously and melt-kneading the same in an extruder.

A molded product according to an embodiment of the present invention may be manufactured from the thermoplastic resin composition. The thermoplastic resin composition has excellent chemical resistance, heat resistance, and impact resistance and also excellent processability and thus may be unlimitedly applied to a molded product requiring resistance about a chemical and specifically used as an automotive interior material requiring resistance about a chemical such as cosmetics and air fresheners.

Hereinafter, the present invention is illustrated in more detail with reference to examples and comparative examples. However, the following examples and comparative examples are provided for the purpose of descriptions and the present invention is not limited thereto.

Hereinafter, preferable examples of the present invention are described. These examples, however, are not in any sense to be interpreted as limiting the scope of the invention.

Examples 1 and 2 and Comparative Examples 1 to 6

The thermoplastic resin compositions according to Examples 1 and 2 and Comparative Examples 1 to 6 were respectively prepared according to a content ratio of components shown in Table 1.

In Table 1, the components of the thermoplastic resin composition were indicated by weight percent based on a total weight of the thermoplastic resin composition.

The components shown in Table 1 were dry-mixed, consecutively dispensed quantitively in a feed section of a twin-screw extruder (L/D=29, ϕ=45 mm), and melted/kneaded. At this time, a barrel temperature of the twin-screw extruder was set to 250° C. Subsequently, the pelletized thermoplastic resin compositions through a twin-screw extruder were dried at about 80° C. for about 2 hours, and then were injection-molded into specimens for evaluating physical properties and 2 mm-thick specimens for evaluating chemical resistance using a 6 oz injection molding machine having a cylinder temperature of about 260° C. and a mold temperature of about 60° C.

TABLE 1

|       | Ex. 1 | Ex. 2 | Comp. Ex. 1 | Comp. Ex. 2 | Comp. Ex. 3 | Comp. Ex. 4 | Comp. Ex. 5 | Comp. Ex. 6 |
|-------|-------|-------|-------------|-------------|-------------|-------------|-------------|-------------|
| (A-1) | 30    | 30    | 30          | 30          | 30          | 30          | 30          | 30          |
| (A-2) | 35    | 35    | 36          | 35          | 35          | 35          | 35          | 35          |
| (B)   | 15    | 14    | 16          | 20          | 15          | 15          | 15          | 15          |
| (C)   | 5     | 5     | 5           | —           | 5           | 5           | 5           | 5           |
| (D)   | 2     | 2     | —           | 2           | 2           | 2           | 2           | 2           |
| (E)   | 6     | 5     | 6           | 6           | 3           | 10          | —           | 13          |
| (F)   | 7     | 9     | 7           | 7           | 10          | 3           | 13          | —           |

Each component shown in Table 1 is illustrated as follows.

(A) Polycarbonate Resin (A-1) First Polycarbonate Resin

Polycarbonate resin having a melt-flow index of 6.0 g/10 min measured at 300° C. under a load condition of 1.2 kgf according to ASTM D1238 standard (Lotte Advanced Materials Co., Ltd.)

(A-2) Second Polycarbonate Resin

Polycarbonate resin having a melt-flow index of 18.0 g/10 min measured at 300° C. under a load condition of 1.2 kgf according to ASTM D1238 standard (Lotte Advanced Materials Co., Ltd.)

(B) Polybutylene Terephthalate Resin

A polybutylene terephthalate resin having intrinsic viscosity of 1.20 dl/g measured by using an o-chloro phenol solvent at 25° C. (DHK 011, Shinkong Co., Ltd.)

(C) Polyethylene Terephthalate Resin

A polyethylene terephthalate resin having intrinsic viscosity of 1.20 dl/g measured by using an o-chloro phenol solvent at 25° C. (BCN76, Lotte Chemical Corp.)

(D) Methyl Methacrylate-Styrene-Acrylonitrile Copolymer

A methyl methacrylate-styrene-acrylonitrile copolymer including 5 wt % of acrylonitrile, 20 wt % of styrene, and 75 wt % of methyl methacrylate and having a weight average molecular weight of about 100,000 g/mol (Lotte Advanced Materials Co., Ltd.)

(E) Acrylonitrile-Butadiene-Styrene Graft Copolymer

An acrylonitrile-butadiene-styrene graft copolymer composed of 45 parts by weight of a butadiene rubber core and 55 parts by weight of a shell graft-polymerized with an acrylonitrile-styrene copolymer, in which 71 parts by weight of styrene and 29 parts by weight of acrylonitrile were included based on 100 parts by weight of the shell, and the butadiene rubber had an average particle diameter of about 300 nm (Lotte Advanced Materials Co., Ltd.)

(F) Acrylonitrile-Butadiene-Styrene Copolymer

An acrylonitrile-butadiene-styrene copolymer including 12 parts by weight of a butadiene rubber core having a dispersed phase, a styrene-acrylonitrile copolymer having a continuous phase and a weight average molecular weight of 190,000 g/mol, and the butadiene rubber having an average particle diameter of about 500 nm (Sinopec Corp.)

Experimental Example

Experimental results are shown in Table 2.

(1) Flowability (g/10 min): A melt-flow index (MI) was measured under a load of 2.16 kg at 250° C. according to ASTM D1238.

(2) Heat Resistance (° C.): A heat deflection temperature (HDT) was measured under a load of 18.5 kg according to ASTM D648.

(3) Impact Resistance (kgf·cm/cm): Notched Izod Impact strength of ¼"-thick specimen was measured at room temperature (23° C.) and low temperature (−40° C.) according to ASTM D256.

(4) Chemical Resistance (grade): ASTM D638 Type I specimens were installed on a zig having a critical strain of 2.1%, coated with a car air freshener (Bullsone) on the surfaces of the specimens, and left at room temperature for 168 hours, and then appearances of the specimens were evaluated. The specific criteria are as follows.

Referring to optical microscopic images of specimens, when a specimen had a less than or equal to 10 μm-long crack on the surface, it was evaluated as Level 1, when the crack was 10 to 20 μm long, it was evaluated as Level 2, when the crack was 20 to 30 μm long, it was evaluated as Level 3, and when the crack was 30 to 40 long, it was evaluated as Level 4, and when the crack was greater than or equal to 40 long, it was evaluated as Level 5.

FIGS. 1 and 2 are optical microscopic images showing the results of chemical resistance evaluation of the test specimens according to Example 1 and Comparative Example 4, respectively.

TABLE 2

| | Ex. 1 | Ex. 2 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| MI | 4.0 | 4.1 | 4.1 | 4.3 | 4.3 | 3.4 | 4.5 | 3.1 |
| HDT | 108 | 109 | 108 | 101 | 109 | 103 | 110 | 100 |
| Izod (23° C.) | 65 | 63 | 58 | 60 | 55 | 65 | 52 | 70 |
| Izod (−40° C.) | 21 | 20 | 18 | 21 | 16 | 21 | 14 | 23 |
| Chemical resistance | 1 | 1 | 1 | 1 | 1 | 2 | 1 | 2 |

Referring to Tables 1 and 2, the polycarbonate resin, the polybutylene terephthalate resin, the polyethylene terephthalate resin, the methyl methacrylate-styrene-acrylonitrile copolymer, the acrylonitrile-butadiene-styrene graft copolymer, and the acrylonitrile-butadiene-styrene graft copolymer were used in optimal amounts to realize a thermoplastic resin composition having excellent flowability, heat resistance, impact resistance, and chemical resistance as well as securing phase stability between the polycarbonate resin and polyester-based resins (the polybutylene terephthalate resin and the polyethylene terephthalate resin).

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

The invention claimed is:

1. A thermoplastic resin composition, comprising:
   (A) 60 wt % to 75 wt % of a polycarbonate resin;
   (B) 5 wt % to 20 wt % of a polybutylene terephthalate resin;
   (C) 2 wt % to 8 wt % of a polyethylene terephthalate resin;
   (D) 1 wt % to 5 wt % of a methyl methacrylate-styrene-acrylonitrile copolymer;
   (E) 3 wt % to 8 wt % of an acrylonitrile-butadiene-styrene graft copolymer comprising a rubbery polymer having an average particle diameter of 200 nm to 400 nm; and
   (F) 5 wt % to 10 wt % of an acrylonitrile-butadiene-styrene copolymer comprising a rubbery polymer having an average particle diameter of 400 nm to 600 nm.

2. The thermoplastic resin composition of claim 1, wherein the acrylonitrile-butadiene-styrene graft copolymer (E) has a core-shell structure comprising
   a core composed of a butadiene-based rubbery polymer, and
   a shell composed by graft polymerization of acrylonitrile and styrene on the core.

3. The thermoplastic resin composition of claim 2, wherein the core is included in an amount of 40 to 50 parts by weight based on 100 parts by weight of the acrylonitrile-butadiene-styrene graft copolymer (E).

4. The thermoplastic resin composition of claim 2, wherein the styrene is included in an amount of 60 to 80 parts by weight and the acrylonitrile is included in an amount of 20 to 40 parts by weight based on 100 parts by weight of the shell of the acrylonitrile-butadiene-styrene graft copolymer (E).

5. The thermoplastic resin composition of claim 1, wherein the acrylonitrile-butadiene-styrene copolymer (F) comprises
   a dispersed phase of a core-shell structure comprising
      a core composed of a butadiene-based rubbery polymer, and a shell composed by graft polymerization of acrylonitrile and styrene on the core, and
   a styrene-acrylonitrile copolymer continuous phase.

6. The thermoplastic resin composition of claim 5, wherein the core is included in an amount of 10 to 15 parts by weight based on 100 parts by weight of the acrylonitrile-butadiene-styrene copolymer (F).

7. The thermoplastic resin composition of claim 1, wherein a weight ratio of the acrylonitrile-butadiene-styrene graft copolymer (E) and the acrylonitrile-butadiene-styrene copolymer (F) is 1:1 to 1:2.

8. The thermoplastic resin composition of claim 1, wherein the methyl methacrylate-styrene-acrylonitrile copolymer (D) is a copolymer of a monomer mixture comprising 60 wt % to 80 wt % of methyl methacrylate, 10 wt % to 30 wt % of styrene, and greater than 0 wt % and less than or equal to 10 wt % of acrylonitrile.

9. The thermoplastic resin composition of claim 1, wherein the methyl methacrylate-styrene-acrylonitrile copolymer (D) has a weight average molecular weight of 50,000 g/mol to 200,000 g/mol.

10. A molded product using a thermoplastic resin composition of claim 1.

* * * * *